(12) United States Patent
Nakajima et al.

(10) Patent No.: US 7,664,536 B2
(45) Date of Patent: Feb. 16, 2010

(54) CHARACTER COMMUNICATION DEVICE

(75) Inventors: Kei Nakajima, Tokyo (JP); Takao Miyoshi, Tokyo (JP); Yuji Naka, Tokyo (JP); Shiro Maekawa, Tokyo (JP); Katsumi Yabuno, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 780 days.

(21) Appl. No.: 11/431,549

(22) Filed: May 11, 2006
(Under 37 CFR 1.47)

(65) Prior Publication Data

US 2006/0203009 A1    Sep. 14, 2006

Related U.S. Application Data

(62) Division of application No. 09/554,065, filed on Apr. 1, 2002, now Pat. No. 7,203,908.

(51) Int. Cl.
*H04B 1/38* (2006.01)
(52) U.S. Cl. .................... 455/563; 455/466; 704/4; 704/277; 379/88.06
(58) Field of Classification Search ................ 455/466, 455/563; 704/4, 277; 379/88.06
See application file for complete search history.

(56) References Cited

U.S. PATENT DOCUMENTS

| | | | |
|---|---|---|---|
| 5,305,206 A | 4/1994 | Inoue et al. | |
| 5,724,457 A | 3/1998 | Fukushima | |
| 6,002,390 A | 12/1999 | Masui | |
| 6,021,336 A | 2/2000 | Kunihiro et al. | |
| 6,104,381 A | 8/2000 | Watanabe et al. | |
| 6,145,084 A * | 11/2000 | Zuili et al. .................... 726/3 | |
| 6,278,886 B1 | 8/2001 | Hwang | |
| 6,487,424 B1 | 11/2002 | Kraft et al. | |
| 6,490,235 B1 | 12/2002 | Iida | |
| 6,580,917 B1 * | 6/2003 | Lefevre et al. .............. 455/466 | |
| 6,633,746 B1 | 10/2003 | Walsh et al. | |
| 6,741,235 B1 | 5/2004 | Goren | |
| 6,810,272 B2 | 10/2004 | Kraft et al. | |

(Continued)

FOREIGN PATENT DOCUMENTS

JP    62-127924    6/1987

(Continued)

OTHER PUBLICATIONS

Notice of Reasons for Refusal from the Japanese Patent Office, mailed May 30, 2006 in Japanese Patent Application No. JP 9-307537.

(Continued)

*Primary Examiner*—Timothy Edwards, Jr.
(74) *Attorney, Agent, or Firm*—Finnegan, Henderson, Farabow, Garrett & Dunner, L.L.P.

(57) ABSTRACT

A character communication device which is connected to a network and enables at least communication by using characters. The device comprises a candidate term display means (S104) for displaying a group of candidate terms prepared for message communication in a candidate term display area (52) of the screen, a term selecting means (2b) for outputting a term which is selected by the operator from the group of candidate terms, and a message generating means (S108) for generating a message by serially displaying a plurality of outputted terms in a message editing area (53) of the screen and sending the generated message to a transmitting/receiving means.

2 Claims, 15 Drawing Sheets

U.S. PATENT DOCUMENTS

| | | |
|---|---|---|
| 6,848,080 B1 | 1/2005 | Lee et al. |
| 6,859,211 B2 | 2/2005 | Friedlander |
| 2001/0029455 A1* | 10/2001 | Chin et al. .................. 704/277 |
| 2002/0188670 A1* | 12/2002 | Stringham .................. 709/203 |
| 2003/0125927 A1* | 7/2003 | Seme ............................ 704/3 |
| 2004/0030542 A1 | 2/2004 | Fuji |
| 2004/0078189 A1 | 4/2004 | Wen et al. |
| 2004/0158471 A1* | 8/2004 | Davis et al. .................. 704/277 |
| 2004/0229697 A1 | 11/2004 | Williams |
| 2006/0133585 A1* | 6/2006 | Daigle et al. ............. 379/88.06 |

FOREIGN PATENT DOCUMENTS

| | | |
|---|---|---|
| JP | 1-137362 | 5/1989 |
| JP | 4-85650 | 3/1992 |
| JP | 5-165979 | 7/1993 |
| JP | 7-036904 | 2/1995 |
| JP | 7-302148 | 11/1995 |
| JP | 8-044640 | 2/1996 |
| JP | 8-237298 | 9/1996 |
| JP | 3032290 | 10/1996 |
| JP | 9-34621 | 2/1997 |
| JP | 9-222952 | 8/1997 |

OTHER PUBLICATIONS

English Translation of HP7-302148-A, Aug. 2005.
English Translation of JP-04085650, Aug. 2005.
English Translation of JP-010137362, Aug. 2005.
English Translation of JP Patent 62[1987]-127924.
International Search Report mailed Feb. 16, 1999 for International Application No. PCT/JP98/05057.

* cited by examiner

Fig.5A

Category 1: Terms related to names

| Player's name | Name of comrade 1 | Name of party 1 |
|---|---|---|
| I | Name of comrade 2 | Name of party 2 |
| We | Name of comrade 3 | Name of party 3 |
| Everybody | Name of comrade 4 | Name of party 4 |
| You | Name of comrade 5 | Name of party 5 |

Fig.5B

Category 2: Nouns, pronouns

| When | party | floor | weapon | front |
|---|---|---|---|---|
| Where | item | enemy | armor | back |
| Who | dungeon | strength | skill | center |
| What | magic | basement | money | left |
| How | wall | ground |  | right |

Fig. 6A

Category 3: Verbs, adjectives

| recover | die | understand | done | do |
|---|---|---|---|---|
| attack | return | stop | give | free |
| defend | proceed | need | turn | hold |
| have | go | enter | check | be |
| escape | come | use | exist | |

Fig. 6B

Category 4: Inflections

| -ed | -able | maybe | no | "ni" |
|---|---|---|---|---|
| -ing | please | but | a lot | "ha" |
| not | kindly | "ka?" | a little | "wo" |
| let | in-, un- | "wa?" | may | "ga" |
| ? | -s, -es | yes | | "no" |

Fig. 7A

Category 5: Symbols, emotional expressions, etc.

| (Laugh!) | Yoo-hoo | 1 | 6 | ! |
|---|---|---|---|---|
| (T_T) | Hurrah! | 2 | 7 | ? |
| (^^) | Lalala | 3 | 8 | person(s) |
| (^_,) | Wow! | 4 | 9 | piece(s) |
|  | Scary | 5 | 0 | floor |

Fig. 7B

Category 6: Sentences registered by a user

| Registered sentence 1 | Registered sentence 6 |
|---|---|
| Registered sentence 2 | Registered sentence 7 |
| Registered sentence 3 | Registered sentence 8 |
| Registered sentence 4 | Registered sentence 9 |
| Registered sentence 5 | Registered sentence 10 |

Fig.8A

| 7 | 8 | 9 |
|---|---|---|
| 4 | 5 | 6 |
| 1 | 2 | 3 |
| 0 |   |   |

Fig.8B

| "de" | "ni" | "wo" |
|---|---|---|
| "ha" | "no" | "ga" |
| ? | ! | (comma) |
| ｡ (full stop) |   |   |

Message conversion table

| Message card Nos. | Languages displayed | | | |
|---|---|---|---|---|
| | Japanese | English | ... | German |
| 1 | ohayou | GOOD MORNING | ... | GUTEN MORGEN |
| 2 | konnichiwa | HELLO | ... | GUTEN TAG |
| 3 | konbanwa | GOOD EVENING | ... | GUTEN ABEND |
| : | : | : | ... | : |
| n | sayounara | GOOD BYE | ... | AUF WIE-DERSEHEN |

CHARACTER COMMUNICATION DEVICE

This is a divisional of application Ser. No. 09/554,065, filed Apr. 1, 2002 now U.S. Pat. No. 7,203,908, which claims priority under 35 U.S.C. § 119 to Japanese Patent Application No. 9-307537, filed Nov. 10, 1997, both of which are incorporated herein by reference.

FIELD OF THE INVENTION

The present invention relates to an apparatus including a character inputting device, especially to an improved technology of inputting characters into an information processing device or a portable communication device which does not have a JIS (Japanese Industrial Standard) keyboard or other types of keyboards for inputting characters.

BACKGROUND ART

"Chat" is a method of online communication conducted on a computer network, either between parties connecting to the network or between a party connecting to the network and his host computer. "Chat" is a conversational function conducted through a network by inputting characters, and its participants generally input words with the aid of a JIS or an ASC keyboard.

In order to participate in a "chat", one must have a terminate device for connection to a network. Various types of terminate devices may be used for this purpose, including a so-called "personal computer", a portable terminate device, or a game device having a modem mounted thereon.

Furthermore, in an online "chat", a foreigner may be included among the participants. In such case, a transmitter sends a message in a language which is understood by the other party of the communication.

However, in the case of a portable termination device (hand-held computer), in order to make the overall shape of the device a small size, mounting a character keyboard in a complete form is difficult. Moreover, in the case of a household game device, due to the purpose or its use as a game device or for cost reasons, a keyboard is not included in a standard game device, or the original design specification of a game device does not allow the connection of a keyboard. Accordingly, input of characters is generally not easy in these devices.

Therefore, one method used is an employment of a graphical user interface (GUI). For example, the user displays on the screen of a device a software keyboard for inputting characters, moves a cursor over such keyboard and selects a character, and makes the selected characters recognized by a computer built inside the device.

However, selecting each character from a software keyboard displayed according to the Japanese fifty-syllabary is time consuming, and is not suitable for a real-time communication such as "chats."

Furthermore, although "chats" are generally performed in a language commonly understood by the parties of communication, it is preferable that "chats" may be easily performed between parties whose languages of daily use are different.

Accordingly, one purpose of this invention is to facilitate the input of characters in an information processing device or a portable communication device which does not have a character inputting keyboard.

Moreover, another purpose of this invention is to provide a character inputting device easy to use even for those who have not learned to type on keyboards.

Furthermore, another purpose of this invention is to provide a character inputting device which facilitates online conversations between communicators speaking different languages.

DESCRIPTION OF THE INVENTION

In order to accomplish the purposes mentioned above, the character communication device according to the present invention is a communication device connected to a network and enabling communication of messages at least by characters, which has a transmitting and receiving means for implementing communication with the communication device of the other party of communication via a network, a communication content displaying means for displaying in a communication content displaying area of a screen display the content of communication with the communication device of the other party, a candidate term displaying means for displaying in a candidate term displaying area of the screen display a group of candidate terms prepared in advance for communication of the messages, a term selecting means for outputting a term selected by a transmitter out of the group of candidate terms, and a message forming means for serially displaying a plurality of output terms in a message editing area of the screen display, and thereby forming a message and sending the formed message to the transmitting and receiving means.

According to such structure, terms shown on a display can be selected, and a message can be formed and transmitted. Accordingly, even those who are not able to type on keyboards can communicate by characters.

In the aforementioned invention, the communication device of the other party is either a host computer executing a program of a communication-type game in accordance with accesses from a plurality of computers having a character communication device, or a communication device operated by participants taking part in the communication-type game.

According to such structure, even if the game devices of the participants taking part in a communication-type game such as RPG does not have a keyboard for inputting characters, messages can be transmitted to the game devices of these participants. Furthermore, online chats can be conducted among participants taking part in a communication-type game.

In the aforementioned invention, the candidate term displaying means receives the group of candidate terms from the communication device of the other party.

According to such structure, terms can be easily obtained even if one's game device does not have a database in advance. Furthermore, in a communication-type game such as RPG, glossaries conforming with the content or progress of the game can be obtained, and there is a higher possibility that terms necessary for the current scene can be selected. Thus, forming messages is made easier. Moreover, forming messages expected by the other party is made easier.

Furthermore, in the invention above, the group of candidate terms is classified at least according to the names of the participants in the game, or game-related nouns, pronouns, verbs, adjectives, inflections, symbols, or short sentences registered by the users.

According to such structure, one may quickly select terms, as soon as possible. This is advantageous for online chats.

Furthermore, the group of candidate terms are arranged in a table in a plurality of pages, and one of such plurality of pages is displayed in the candidate term displaying area.

According to such structure, even if the displaying area of the screen is formed as a relatively small area, a group of terms for selection can be displayed efficiently in such area. Furthermore, by turning the pages, one may easily move to another page.

Another communication device of the present invention has a storing means for storing a message language conversion table including a single message expressed in a plurality of languages, a menu displaying means for selectably displaying on a menu screen of a display a plurality of messages expressed in a single language, a language conversion means for referring to the message language conversion table and converting a selected message to a message in a language of a party with whom communication is held, and a transmitting means for transmitting the converted message to the communication counterpart.

According to such structure, firstly, communication by characters (chats) can be conducted in a form of cards without requiring a keyboard. Secondly, even if the communicators use different languages, conversations can be held in their respective languages. Thirdly, the load of information processing for conversion of languages is conveniently small because the user has to only select applicable messages out of a plurality of messages displayed in different languages.

Furthermore, communication device of the present invention has a storing means for storing a database including a plurality of messages in a single language and marks added to each of the messages, a menu displaying device for selectably displaying some of the plurality of messages on a menu screen of a display, a message mark outputting means for outputting marks corresponding to a selected message by referring to the database, and a transmitting means for transmitting the output message marks to a party with whom communication is held.

According to such structure, since messages are sent not in a series of words but in marks corresponding to the messages, the amount of transmission information required for the messages is small, and handling thereof is easy. Furthermore, since common marks are added to a group of messages having common meanings, replacement to a message in another language is facilitated.

By displaying the aforementioned messages in a form of cards, conversation can be held by showing the cards. By making the messages uniform in the form of cards, handling of messages, the language conversion and the preparation of database, etc. are facilitated.

By having the aforementioned character communication device formed inside (built in) a household game device, communication by characters are performed at a relatively low cost with the aid or a game device having a relatively small storing capacity and not including a keyboard in its standard package. This is advantageous especially when playing a communication-type game.

Regarding a device for inputting characters, it is possible to perform input operations via a device which can be used for selective operation, for example, via a game controller (a control pad, joystick, etc.) serving as an inputting device of the game device.

The character communication system according to the present invention is a character communication system connected to a network and structured to include a plurality of character communication devices capable of performing message communication at least by characters, and includes a first character communication device used for communication by a first message group in a single language, and a second character communication device used for communication by a second message group in a plurality of languages, wherein communication between the first and second character communication devices are performed using marks commonly added in advance to messages having common meanings, included in each of the first message group and the second message group.

According to such structure, obtained is a character communication system having a small message transmission capacity and easily displaying in different languages the messages having the same meanings.

The character communication system according to the present invention is a character communication device having a first character communication device for displaying messages in a first language, a second character communication device for displaying messages in a second language, and a network for connecting both communication devices, wherein the first character communication device has a storing means for storing a message table including a plurality of messages in the first and second languages, a message displaying means for selectably displaying on a screen some of the plurality messages in the first language, a language conversion means for converting an applicable message in the first language to a message in the second language by referring to the message table, and a transmitting means for transmitting the converted message to the second character communication device.

According to such structure, it is possible to transmit from one's station a message which has been converted into the language of a party with whom communication is held.

The character inputting device according to the present invention is a character communication device for inputting characters expressed by a combination of vowels and consonants, which includes a consonant inputting means for mainly inputting consonant information of characters which are to be input, a vowel inputting means for mainly inputting vowel information of characters which are to be input, and an input character identifying means for identifying characters input according to a combination of consonant information and vowel information.

According to such structure, Japanese kana characters can be input easily by using one's senses. This is especially advantageous when inputting Japanese characters.

In the aforementioned character inputting device, the consonant inputting means and the vowel inputting means are respectively arranged on the operation panel of the character inputting device, and wherein the consonant inputting means is arranged, such that it is positioned toward one side of the operation panel with respect to the center position thereof in the longitudinal direction, and the vowel inputting means is arranged to be positioned toward the other side of the operation panel with respect to the center position thereof in the longitudinal direction, and both of the consonant inputting means and the vowel inputting means can be operated manually with both hands holding the operation panel.

According to such structure, the device can be used with both hands for inputting characters even when the device is held in the user's hand. Therefore, this is advantageous for a character inputting device of a portable communication device.

In the aforementioned character inputting device, the consonant inputting means can be structured by a figure keyboard mainly including a plurality of figure keys, and the vowel inputting means can be structured by a composite switch for producing a plurality of types of output in accordance with the operational status of one actuator.

The aforementioned composite switch can be structured by a cross key, a joystick, a pointing device, a trackball, etc.

Furthermore, the portable communication device including the aforementioned character inputting device is easy to understand using one's senses, even for those who are not accustomed to keyboard operation, and therefore, input in the Japanese language is easily conducted. Secondly, even when the portable communication device is held in the user's hand, both hands can be used upon inputting operations. Thirdly, since the built-in character inputting device is small and takes up less space, it is advantageous for a portable communication device.

BRIEF DESCRIPTION OF THE DRAWINGS

FIGS. 5A and 5D are explanatory diagrams illustrating examples of term categories. FIGS. 6A and 6B are explanatory diagrams illustrating examples of term categories. FIGS. 7A and 7B are explanatory diagrams illustrating examples of term categories. FIG. 8A is an explanatory diagram illustrating a mini-window for inputting figures. FIG. 8B is an explanatory diagram illustrating a mini-window for inputting te/ni/wo/ha particles (Japanese postpositional particles). FIG. 12 is an explanatory view illustrating an example of a message conversion table.

BEST MODES FOR CARRYING OUT THE INVENTION

The First Embodiment of the present invention will be explained below with reference to the drawings.

Figure 2:
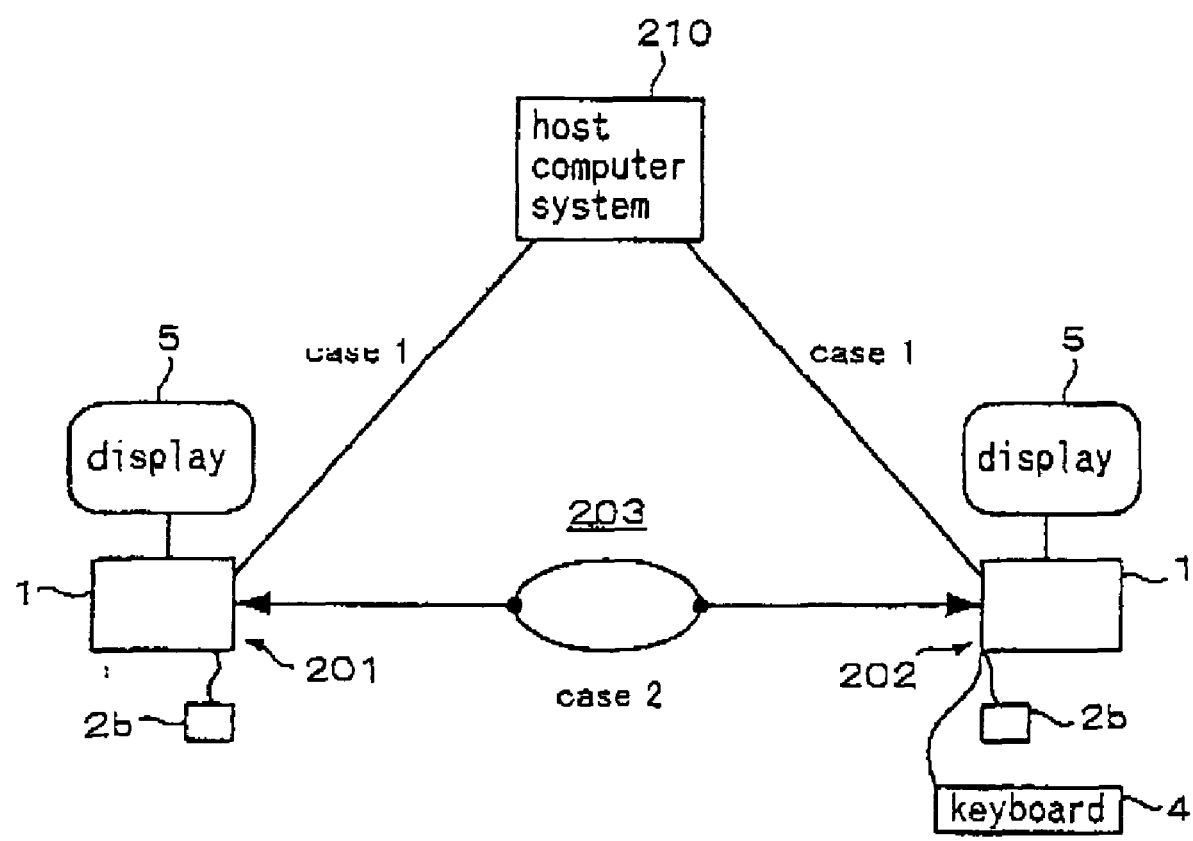
FIG. 2 is an explanatory view illustrating the overall structure of a communication network.

FIG. 2 is an overall block diagram showing the outline of the communication system according to the present inventions FIG. 2 shows direct connection of communication terminal devices 201 and 202 capable of character communication via a network 203, as well as indirect connection of terminal devices 201 and 202 via a host computer 210. The network 203 includes a public communication line, a dedicated line, the Internet, a LAN, etc. The host computer 210 includes a data processing function and a data exchange function, and is connected to the terminal devices 201 and 202 via the aforementioned network 203. The data processing above may include host functions of a communication-type game. In such case, the host computer, which is a server of a game, provides event information, map information, game parameters, coordinate moving information, character status information and other information. A plurality of terminal devices are connected to the network 203, and the terminal devices contemplated here are not only limited to the terminal devices placed in domestic areas but also those placed abroad.

Besides a dedicated communication device, the terminal device includes a game device having a personal computer or a communicational function. The terminal device includes at least a main body, a display, and an inputting device.

As explained below, the terminal device may be accomplished, for example, by a household game device. In such case, the game device includes a main body 1 of the game device, and a game controller (for example, control pad) 2b which serves as a game input device.

The terminal device 202 may also be accomplished by a similar structure, and in the present embodiment, a keyboard 4 is further provided. However, the keyboard 4 is not essential to the present invention.

Figure 3:
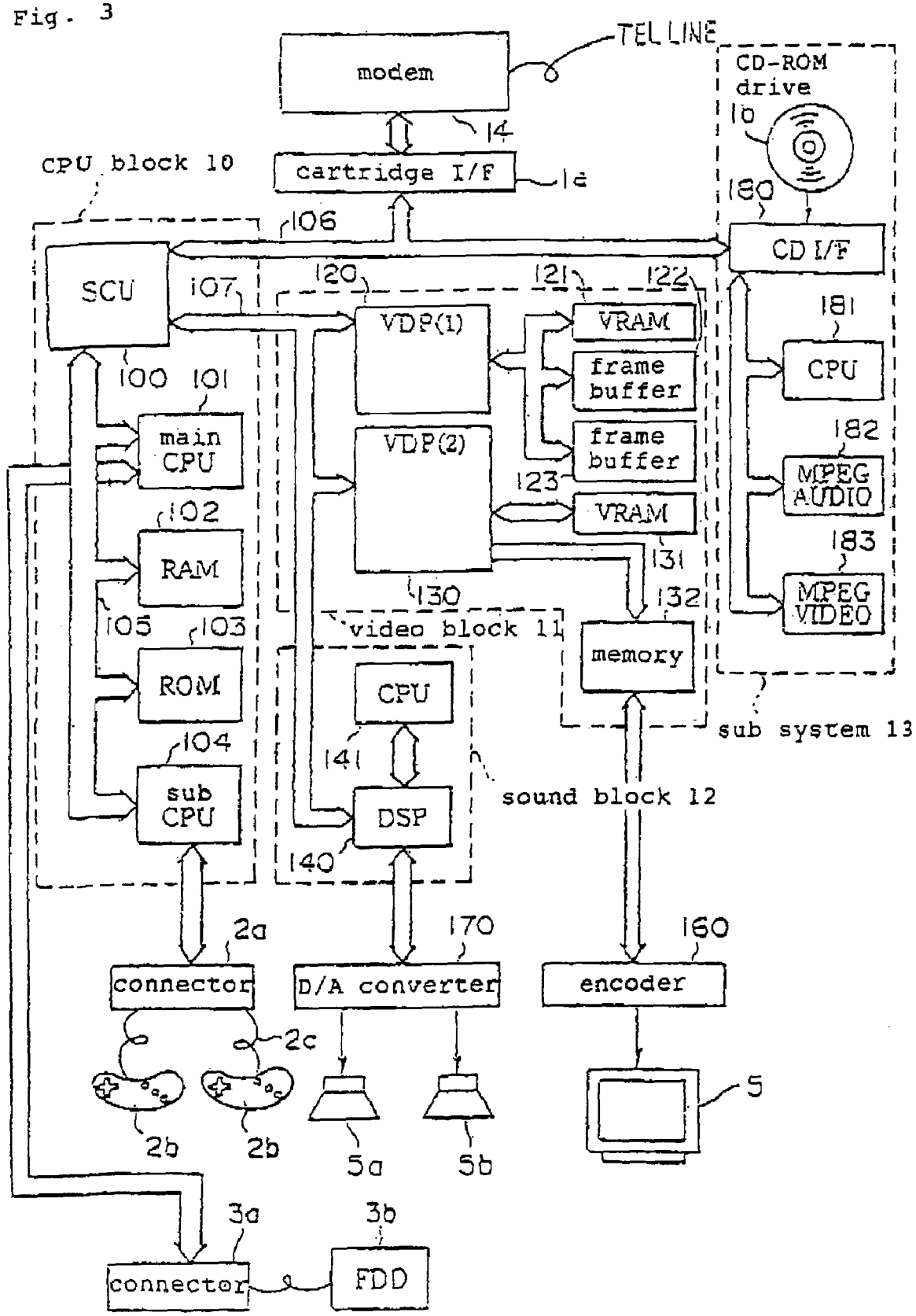
FIG. 3 is a block diagram illustrating an example of a game device which has a communicational function.

FIG. 3 shows one example of the terminal device 201 or 202, and here a game device having a modem is used. This game device can be used as a network terminal device, and one may play the so-called "communication-type game".

The game is mainly structured by a CPU block 10 for controlling the entire device, a video block 11 for controlling display of a game screen, a sound block 12 for generating sound effects, etc., a subsystem 13 for reading CD-ROMs, and a modem 14 for implementing data communication with an outside party.

The CPU block 10 is structured by an SCU (System Control Unit) 100, a main CPU 101, a RAM 102, a ROM 103, a cartridge I/F 1a for connecting a modem, etc., a sub CPU 104, a CPU bus 103, etc. The main CPU 101 controls the entire device. The main CPU 101 includes inside thereof a computing function similar to a DSP (Digital Signal Processor), and is capable of executing an application software at a high speed. The main CPU 101 automatically recognizes the type of a peripheral (FDD 3b in FIG. 3) connected to a connector 3a, and conducts data communication between such peripheral. More specifically, the peripheral is connected to the SCI which is built in the main CPU 101. Furthermore, connected to the serial connector 3a are SCI signal lines from a master SH and a slave SH, three each, as well as a MIDI in/out signal lines from a SCSP (sound DSP). Moreover, the FDD 3b is used, for example, for storing the data of the backup memory (stores various data and parameters of a game; not shown in the Figure) on a floppy disk, or for copying floppy disk data into the backup memory.

The RAM 102 is used as a work area of the main CPU 101. The ROM 103 has an initial program for initialization processing, etc. written thereunto. The SCU 100 allows, by controlling buses 105, 106 and 107, smooth input and output of data between the main CPU 101 and VDPs 120, 130, DSP 140, CPU 141, etc. The SCU 100 internally includes a DMA controller, and is capable of transmitting to a VRAM of the video block 11 spring data during a game. This allows execution of games and other application software at a high speed. The cartridge I/F 1a allows input of an application software which is provided in a form of a ROM cartridge (not shown). Furthermore, it allows use of the modem 14 in a form of a cartridge for transmission and reception of data. By using a modem, one can play the so-called "communication-type game". The aforementioned game parameters, etc. are exchanged between the game server and the CPU 102.

The sub CPU 104, which is called the "SMPC (System Manager & Peripheral Condition)," has functions such as collecting peripheral data from a pad 2b via a connector 2a according to a request received from the main CPU 101. The main CPU 101 implements processing such as moving combat vessels shown in a game screen according to the peripheral data received from the sub CPU 104. A desired peripheral selected from a pad, a joystick, a keyboard, etc. can be connected to the connector 2a. The sub CPU 104 has a function of automatically recognizing the type of the peripheral connected to a connector 2a (terminal on the main body side), and collecting peripheral data, etc. in a communication system according to the type of each peripheral.

The video block 11 includes the VDP (Video Display Processor) 120 for drawing video game characters etc., which is made of polygons, and the VDP 130 intended for drawing background pictures, synthesizing polygon picture data with the background pictures and implementing clipping processing, etc. The VDP 120 is connected to a VRAM 121 and frame buffers 122 and 123. The polygon drawing data representing the characters of the video game device are sent from the main CPU 101 to the VDP 120 via the SCU 100, and then written in the VRAM 121. The drawing data written in the VRAM is drawn in the drawing frame buffer 122 or 123 in, for example, a 16- or 18-bit/pixel form. The data of the frame buffer 122 or 123 which includes drawings therein are sent to the VDP 130. Information for controlling the drawing processing is provided from the main CPU 101 to else VDP 120 via the SCU 100. The VDP 120 then executes drawing processing according to these orders.

The VDP 130 is connected to the VRAM 131, and is structured such that the picture data output from the VDP 130 are output to an encoder 160 via a memory 132. The encoder 160 adds synchronizing signals to these picture data and thereby produces image data, and outputs such data to a TV receiver 5. As a consequence, various types of game screens are displayed on the TV receiver 5.

The sound block 12 is structured by the DSP 140 for synthesizing sounds according to the PCM or FM method, and the CPU 141 for controlling the DSP 140. Sound data produced by the DSP 140 are converted to 2-channel signals by the D/A converter 170 and thereafter output to a speaker 5b.

The subsystem 13 is structured by a CD-ROM drive 1b, a CD I/F 180, a CPU 181, an MPEG AUDIO 182, an MPEG VIDEO 183, etc. The subsystem 13 has functions such as reading application software provided in a form of a CD-ROM, and replaying animations. The CD-ROM drive 1b reads data from the CD-ROM. The CPU 181 implements processing such as controlling the CD-ROM drive 1b, correcting errors in data which are read out. Data read from the CD-ROM are provided to the main CPU 101 via the CD I/F 180, the bus 106, the SCU 100, and are used as application software. Furthermore, the MPEG AUDIO 182 and the MPEG VIDEO 183 are devices for restoring data compressed according to the MPEG (Motion Picture Expert Group) standard. By restoring the MPEG compressed data written in the CD-ROM with the aid of the MPEG AUDIO 182 and the MPEG VIDEO 183, animations can be replayed.

When playing a communication-type game under such structure, provided on the side of the game device are, for example, all graphic data including fonts, sound data, tutorial maps, mail documents (backup RAMs), etc. Graphic data, etc. are provided, for example, by a CD-ROM. Furthermore, provided on the side of the server are, for example, map data, event data (message data, etc.), monster parameters, various parameter data, backup information, etc. Basically, graphic data are held at the side of the game device, and data group including parameters are held on the side of the server. Parameters and map information are administered on the side of the server in their entirety, and information on results thereof is received on the side of the game device, where display of the screen is processed in a specialized manner. Operation of the map data and parameters by the server allows for the provision of games with new content without CD-ROMs being changed. Furthermore, game parameters (strength of characters) held on the side of the server allows entry of new types of monsters according to the rise of the user's level.

In a communication-type game, one may find comrades of a game by playing the game through a network. For example, in a network RPG (Role Playing Game,) multiple players at different locations can form a party in a virtual game space. Individual characters representing the respective players can be controlled in the virtual space. In such case, intentions of the players, must be mutually communicated. For example, players need to talk with a party whom he meets for the first time, or to discuss with a comrade a destination of their adventure, or to consult strategies at the time of a combat. A chat function (real time conversation system by characters) is provided for this reason. Furthermore, a telegram function can be used while the other player logs onto the server, which allows a player to send messages to a specific party (or the other party) regardless of the location or the status of the player or the other party. This function is effective when contacting one's friends and acquaintances. Furthermore, in a virtual game space, there may be provided a bulletin board as a means of communication united with the world of game, or a letter transmission function for sending letters to a specific party.

The chat function and the telegram function, etc. described above are usually performed with the aid of a keyboard intended for inputting characters. However, in the present game device, the keyboard is generally provided as an optional item, and is not included in the same package as the main body of the game device. Accordingly, a character interface for inputting characters is prepared for the purpose of typing keywords. Nonetheless, such inputting device is not limited to game pads.

A character interface (character inputting device) will be explained below with reference to FIGS. 1 through 4.

A control pad 2b is provided with, for example, the respective switches in the forms of buttons A, B, C, X, Y, Z, L, R, and further with a cross key. In a character inputting mode for chats, etc., prescribed functions are assigned to the respective buttons. For example, button A is a shift key for switching the cross key to move between categories, button B for back space (deletion of one letter), button C is for determining words, button X is for turning on/off the display of a mini-window for inputting figures, button Y is for turning on/off the display of a mini-window for inputting te/ni/wo/ha particles (Japanese postpositional particles), button Z is for CR (message transmission), button L is for moving the cursor forward by one keyword category, button L for moving the cursor backward by one keyword category, and the cross keys has a function of outputting orders for selecting words (moves between categories when button A is pressed).

Figure 1:
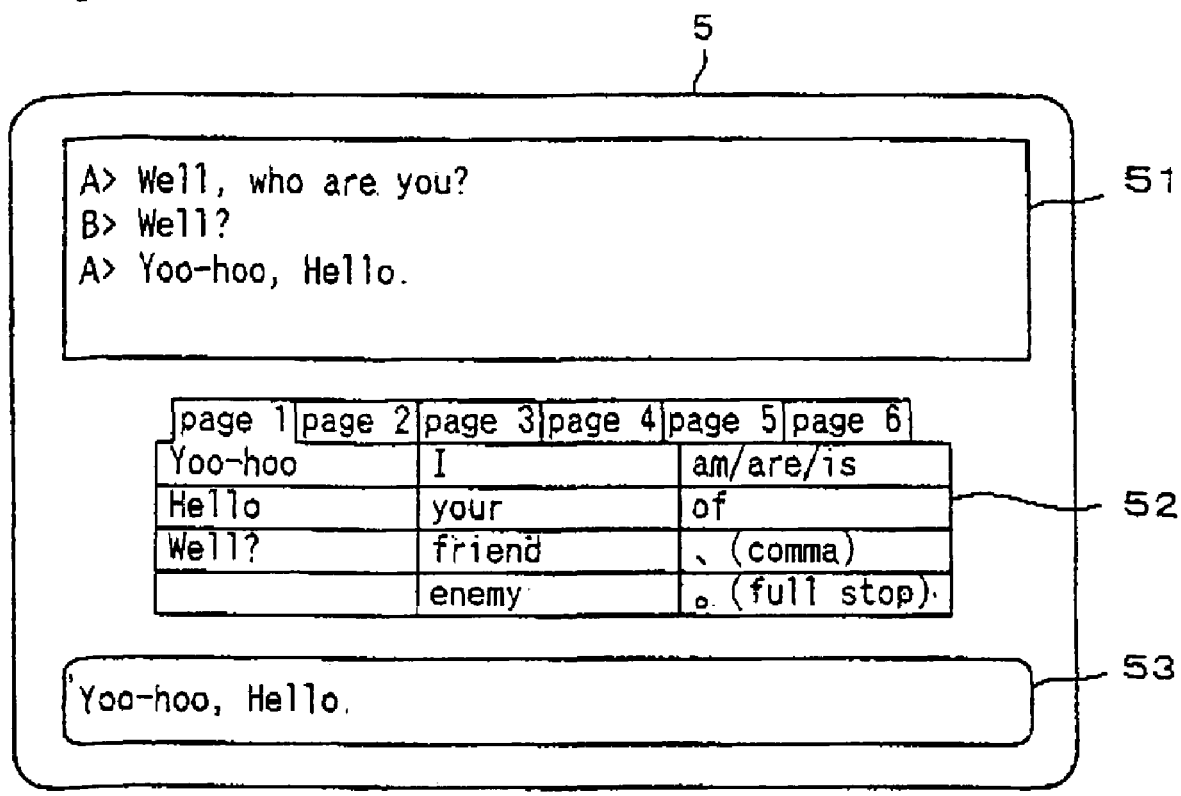
FIG. 1 is an explanatory view illustrating a message forming screen of a character communication device according to the present invention.

FIG. 1 shows an example of a chat screen. Displayed on the screen of the display 5 are a chat window (communication content displaying area) 51 for displaying the content of conversation, a keyword category window (candidate term displaying area) 52 for displaying keywords (terms) according to categories, and an editing window (message editing area) 53 for editing messages.

Figure 4:
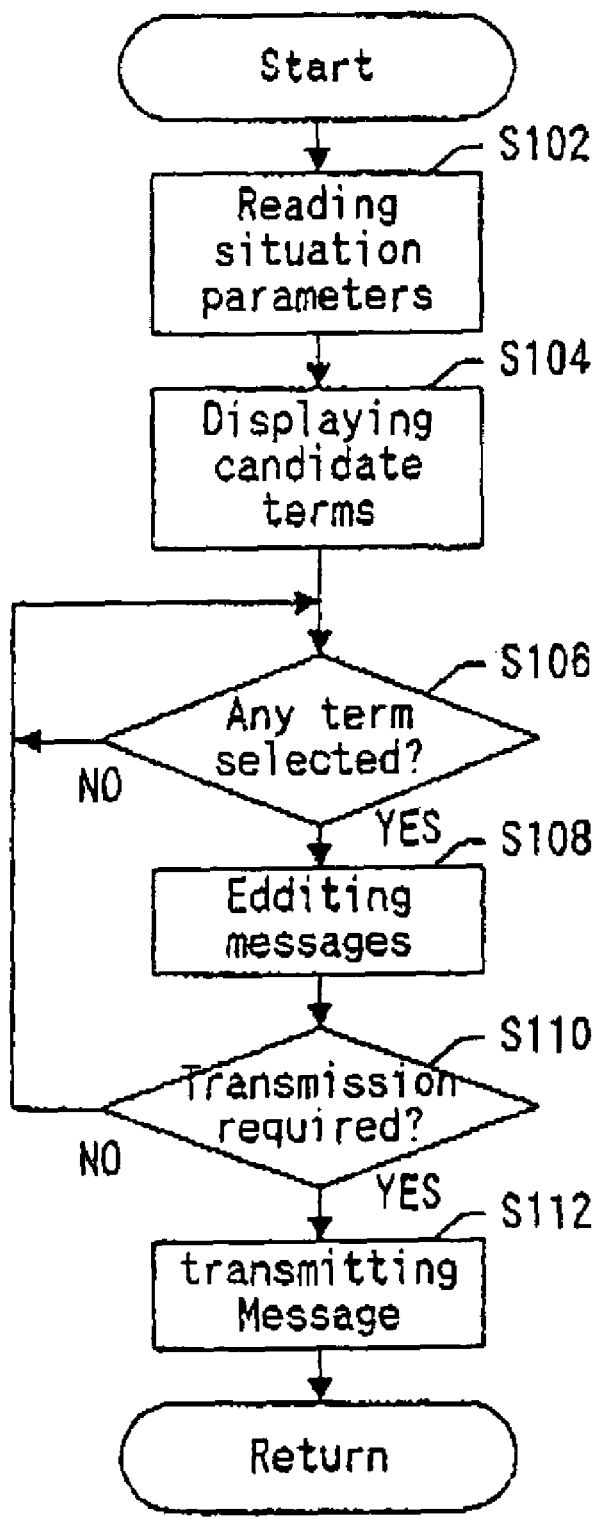
FIG. 4 is a flowchart illustrating a message formation processing in the character communication device.

If, during the execution of the main program, the main CPU 101 identifies placement of a flag for performing chats, then the main CPU 101 executes a program (algorithm) as shown in FIG. 4. For example, in the case of a party organizing mode, if button A of the pad 2b is pressed by a player upon a scene where participation to a prescribed team is recruited, or at the state of a guidance screen displayed during the game, or upon a scene where the characters discuss and exchange information at a bar for making friends, then the chat mode is designated and a flag is thereby placed. As a result, messages can be exchanged, and the party members can consult with one another.

Among the game parameters, the CPU 101 reads parameters (situation parameters) showing the current situation (for example, scenes) (S102). A variety of "current situations" is contemplated, including participation to a party, sending a telegram, sending a letter, viewing a guidance screen, conversation at a bar, strategy meeting prior to a combat, discussing a course of adventure, etc. A set of terms corresponding to the current situation is read from a database recorded in a CD-ROM and is displayed on the keyword category window 52. Furthermore, as shown in FIGS. 5 through 8, sets of terms are prepared according to categories.

FIG. 5A shows a table for category 1, collecting terms related to names. Registered here are personal pronouns, names of party participants, and names of other communicators. Furthermore, senders of telegrams or letters can be automatically registered to the table. FIG. 5B shows a table for category 2, collecting terms such as nouns and pronouns. FIG. 6A shows a table for category 3, which collects terms such as verbs, and adjectives. FIG. 6B shows a table for category 4, where inflection terms are collected. FIG. 7A shows a table for category 5, collecting symbols, emotional expressions, and other terms. FIG. 7B shows a table for category 5, collecting short sentences registered by the user in advance.

FIG. 8A shows the mini-window for figures, and FIG. 8B shows the mini-window for te/ni/wo/ha particles (Japanese postpositional particles). In these mini-windows, by operating a single key (X, Y buttons), one-letter figures or characters that are frequently used can be called out. Mini-windows may overlap the category windows when they are displayed or input.

The player may switch and display the aforementioned sets of terms according to categories (fields, groups, items, etc.) (S104). When there are many of terms, the terms are divided into several pages, and the content of a single page selected (for example, page 1, as shown in FIG. 1) is displayed. By introducing the page concept, the display area can be used effectively. This also enables easy switching of the content displayed (pages).

The player selects terms by operating the control pad 2b. As described above, by operating the cross key, the cursor (or reverse display or other selected display) is moved and a term is selected. By operating the button concurrently with the cross key, categories are switched. Button C is then pressed and a term to be selected is determined, and the term selection flag is placed.

When the CPU 101 identifies selection of a term (S106), the selected term, for example, "yah-ho-" ("yoo-hoo" in Japanese) is transferred to the message editing program. The message editing program has a simple editor function. With the aid of this program, the selected terms are displayed in the message editing window 53 (S108). Subsequently, when "," (comma), "konnichiwa" ("hello" in Japanese), "$_o$" (fullstop in Japanese) are input, the editing window 53 similarly displays "yah-ho-, konnichiwa$_o$" of ("yoo-hoo, hello." in Japanese). In the message editing window 53, by using the editor function, messages can be modified, altered or input with a keyboard (S106 through S110; No).

When a message is formed and button Z is operated, a message transmission flag is placed. When this is identified by the CPU 101 (S110; Yes), the message assembled within the message editing window 53 is transmitted (S112). Messages transmitted to and received from the other party are stored in the RAM 102 and displayed in the chat window 51 by a communication displaying program.

Thus, when the player selects necessary terms from a table of terms with the aid of the pad 2b, the selected terms are assembled and a message is thereby formed. By transmitting such message, chats by characters can be conducted.

Although according to the embodiment explained above, data transmission is conducted between the terminal device (game device) and the host computer system (game server) using characters, the host computer system (game server) includes a database which stores sets of terms shown in FIGS. 5 through 8, thereby enabling transmission of a relevant set of terms to the terminal device. Furthermore, data transmission in characters can be performed between terminal devices (game device) without the intermediation of the host computer. In such case, as in the case of communication with the host, terms can be selected from a table for inputting characters, whereby messages can be formed and thereafter transmitted.

The second embodiment will be now explained with reference to the FIGS. 9 through 12. In this embodiment, instead of assembling terms and forming a message as in the first embodiment, message cards shown on the screen are selected and mutually sent, thereby enabling the exchange of messages. In this processing, if different languages are used by the communicators, the languages of the message cards can be converted for overcoming any inconvenience caused by the difference in the languages. Since the second embodiment may have the structure of the device shown in FIGS. 2 and 3, explanation on such structure will be omitted.

Foremost, the outline of the second embodiment will be explained.

Figure 9A:
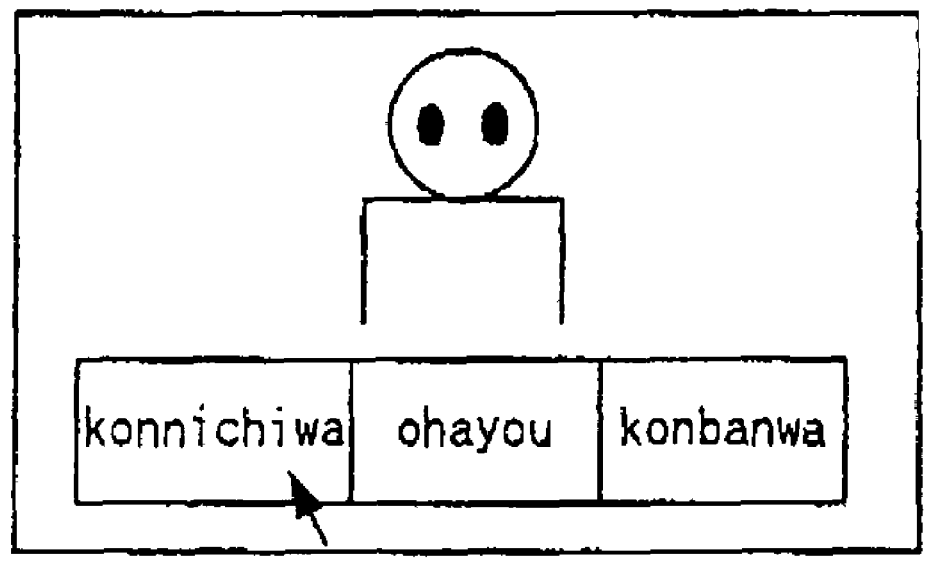
FIGS. 9A and 9B are explanatory diagrams illustrating a character conversation where message cards are used.

FIG. 9A shows an example of a display screen at the time the terminal device is set at the message exchange mode. On the screen of a monitor 5, greeting message cards are displayed. The first card reads "konnichiwa" ("hello" in Japanese), the second card "ohayou" ("good morning" in Japanese), and the third card "konbanwa" ("good evening" in, Japanese). The communicator operates the control pad and moves the cursor over an applicable message card, for example, "ohayou" ("good morning" in Japanese), and operates the selection button.

Figure 9B:
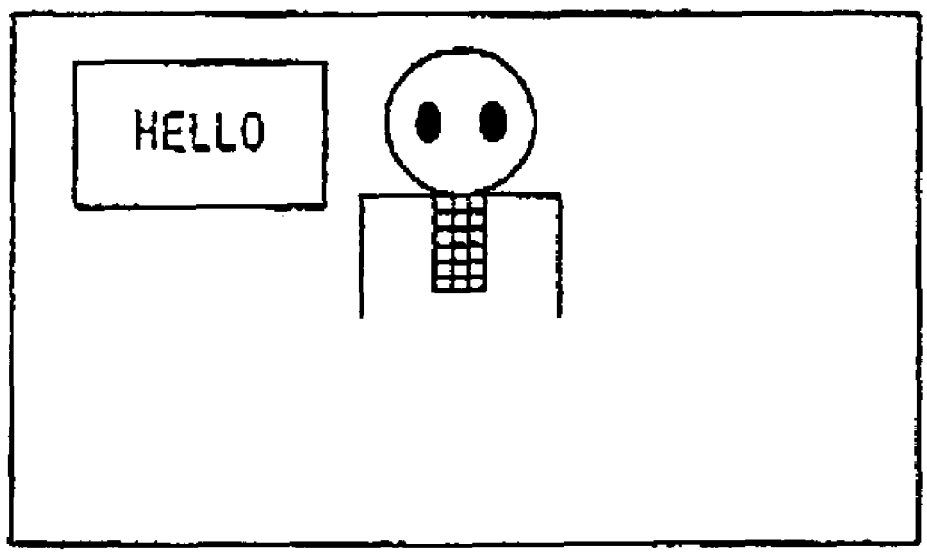

FIG. 9B shows an example of the other English-speaking communicator's display screen when the terminal device is in the message exchange mode. Here, "konnichiwa" ("hello" in Japanese) is converted and displayed as "HELLO".

Figure 10:
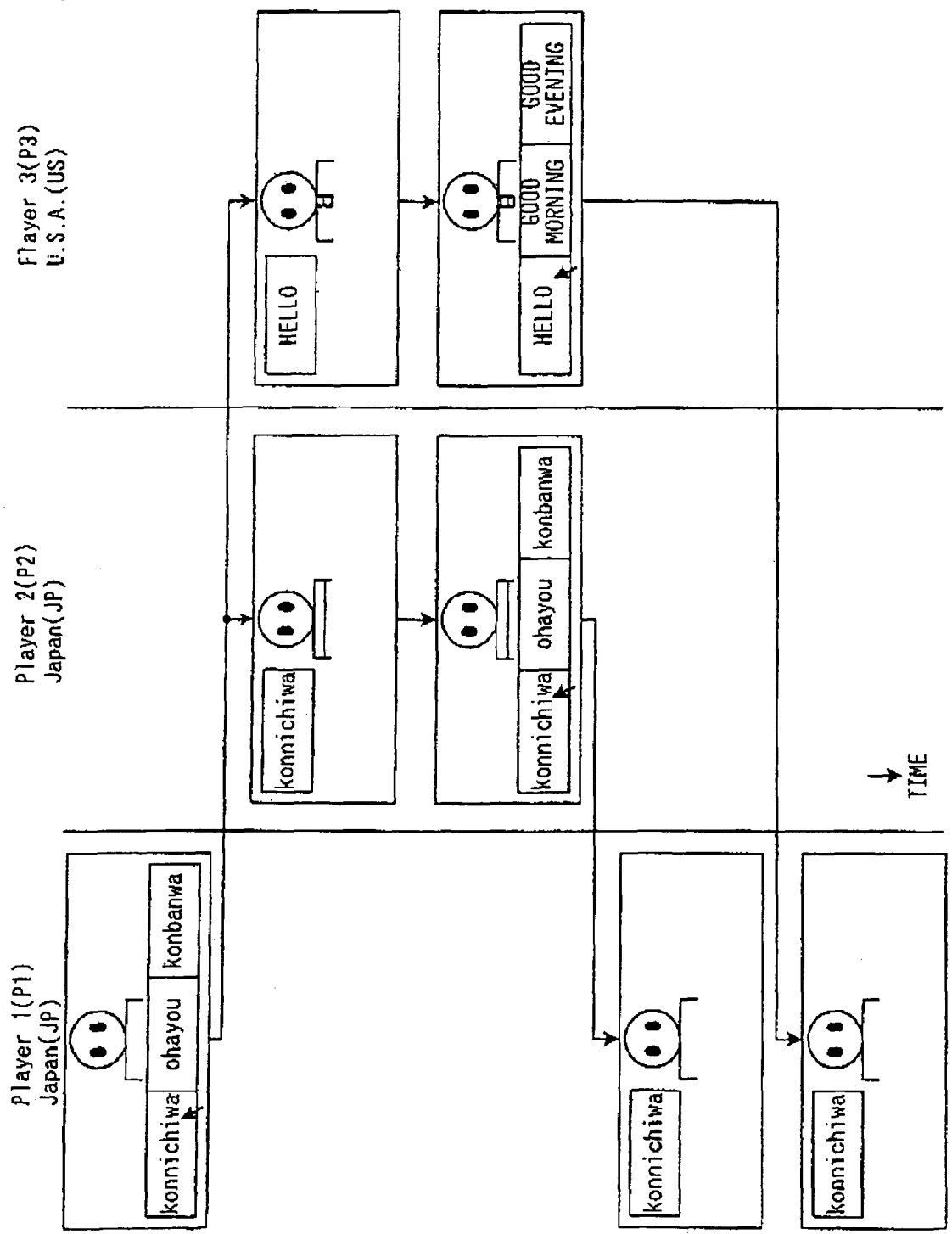
FIG. 10 is an explanatory diagram illustrating a character conversation conducted by three parties.

FIG. 10 shows an example where player 1 (Japanese language) sends a message card to player 2 (Japanese language) and player 3 (English language). In the game devices of the respective players, a message conversion table shown in FIG. 12 is stored in advance. The conversion table is provided by a CD-ROM or a game server.

A greeting message card is displayed on the monitor screen of the first player's game device. The first card reads "konnichiwa" ("hello" in Japanese), the second card "ohayou" ("good morning" in Japanese), and the third card "konbanwa" ("good evening" in Japanese). The first player selects "konnichiwa" ("hello" in Japanese), designates a receiving party, and sends the message to the server. The receiving party can be an individual party or all of the party participants. Message card no. "2" corresponding to "konnichiwa" ("hello" in Japanese) is sent to the server. The server sends to the designated receiving party message card no. "2", which corresponds to "konnichiwa" ("hello" in Japanese). For example, message card no. "2" is transmitted to player 2 and player 3 who are participating in a communication-type game together with player 1.

The terminal device of player 2 refers to the message conversion table shown in FIG. 12, decodes message card no. "2" to "konnichiwa" ("hello" in Japanese). The message "konnichiwa" is displayed on the screen.

The terminal device of player 3 refers to the message conversion table shown in FIG. 12, decodes message card no. "2" to "hello". The message "hello" is displayed on the screen.

In order to send a reply, player 2 designates a message selection mode to the terminal device and displays multiple greeting message cards on the screen. "Konnichiwa" ("hello" in Japanese) is selected and transmitted to player 1. Message card no. "2", corresponding to "konnichiwa" ("hello" in Japanese) is sent to the server and then transferred to player 1 from the server. The terminal device of player 1 refers to the message conversion table and decodes the received message card no. "2" into "konnichiwa" ("hello" in Japanese) and displays the message card "konnichiwa" on the screen.

Similarly, in order to send a reply, player 3 designates the message selection mode to the terminal device and displays multiple greeting message cards on the screen. "HELLO" is selected and transmitted to player 1. Message card no. "2" is sent to the server and then transferred to player 1 from the server. The terminal device of player 1 refers to the message conversion table and decodes the received message card no. "2", into "konnichiwa" ("hello" in Japanese) and displays the message card "konnichiwa" on the screen.

Online conversation (chat) by characters is thus performed between the players.

By referring to the message conversion table, the respective terminal devices can directly convert messages into the receiving party's language and send such messages. For example, when player 1 selects "ohayou" ("good morning" in Japanese), the terminal device may refer to the message conversion table and convert the message into "GOOD MORNING" which corresponds to "ohayou" (good morning), and send to the server the message "GOOD MORNING" which is represented by a group of character codes.

Furthermore, when messages are exchanged between terminal devices utilizing different languages, the server may assume the role of referring to the message conversion table and converting the languages of the messages.

Figure 11:
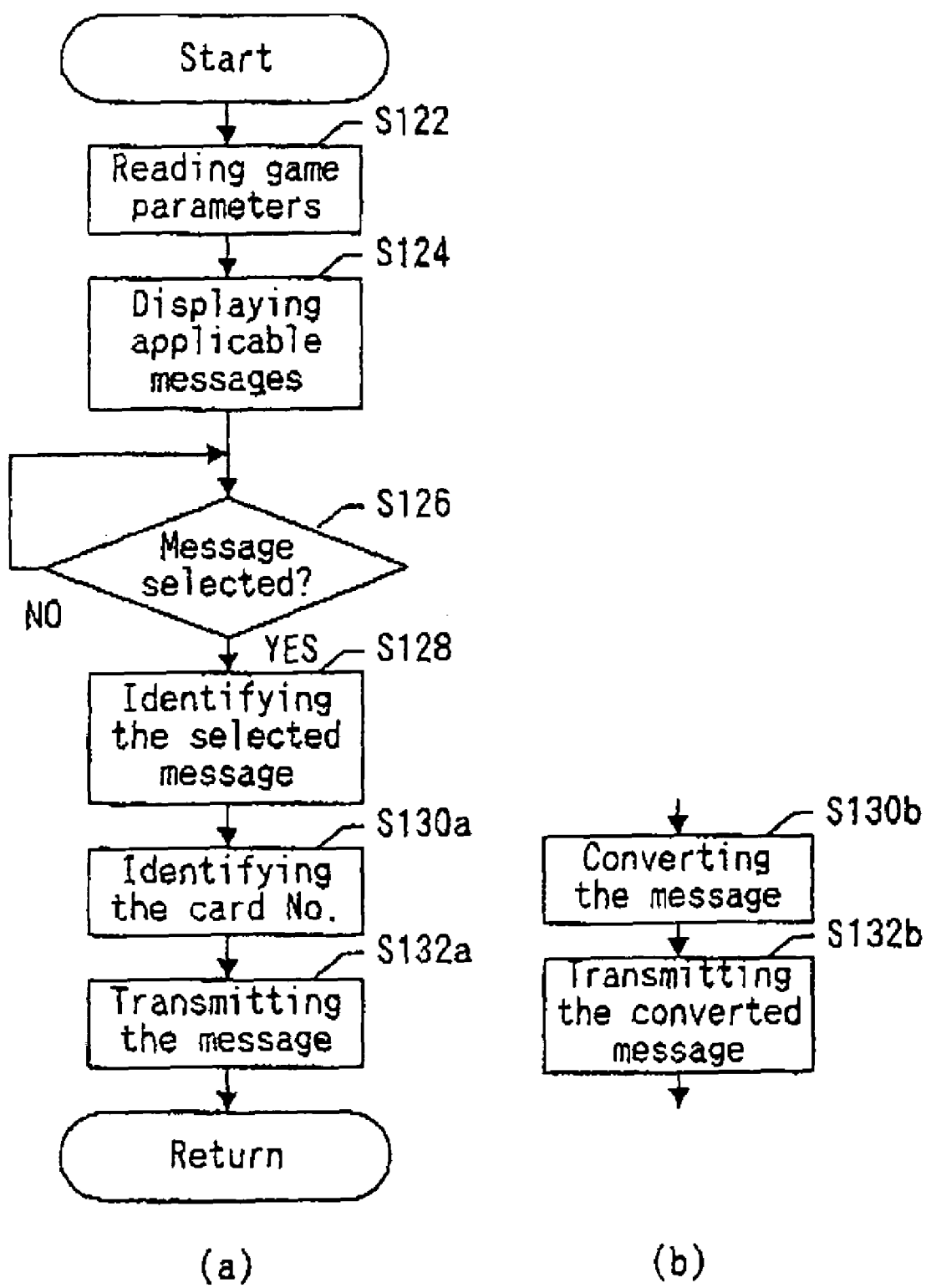
FIG. 11 is a flowchart illustrating communication by three parties using message cards.

FIG. 11 is a flowchart explaining the message transmission operation implemented at the respective devices.

The CPU (for example, the main CPU 101) of the terminal device implements these procedures when a card message mode flag is identified during the execution of the main program (not shown).

Foremost, the CPU reads game parameters (S122) and displays on the screen multiple message cards according to the progress of the current game. Sets of message cards can be displayed according to the respective categories (fields, groups, items, etc.) (S124).

The player operates the cursor and selects a message card. As explained above, the cross key of the game pad 2b is moved for moving the cursor (or reverse display or other selected display), and a message card is thereby selected. By operating button A concurrently with the cross key, message card categories are switched. When button C is pressed and a message card to be selected is determined, a selection flag is placed.

When the main CPU 101 identifies that a message card has been selected (S126), the selected message card is identified according to the position of the card on the screen, as well as the position of the cursor on the screen (S128). The number of the card selected is then identified. For example, if the message card "konnichiwa" ("hello" in Japanese) is selected, message card no. "2" is identified (S130a). Message card no. "2" is transmitted to the server together with an address to which it is to be sent (S132a). If the message is addressed to player 2 and player 3, message card no. "2" is transferred to player 2 and player 3 from the server. The terminal device of player 2 refers to the message conversion table and converts message card no. "2" into "konnichiwa" ("hello" in Japanese) and displays such message card on the display. The terminal device of player 3 refers to the message conversion table and converts message card no. "2" into "HELLO" and displays the message card "HELLO" on the display.

Online conversation using message cards can be thus performed.

One modification of the second embodiment will be explained with reference to FIG. 11B.

According to the third embodiment, instead of transmitting message card no. "2", the message is converted into the receiving party's language at the terminal device and the message is transmitted to the receiving party after the language of the message has been converted. Therefore, the algorithm steps S130a and S132a described above are modified.

In other words, by referring to the message conversion table, the identified message (S128) is converted to the receiving party's language (S130b). For example, in the case of a message card "konnichiwa" ("hello" in Japanese), the message is converted into "HELLO". The message is transmitted to the receiving party after the language of the message has been converted (S132b).

Thus, exchange of message cards and performance of online chats between players speaking different languages can be accomplished also by this method.

Although the embodiments described above suggest performance of online conversation and communication by characters via the server, the present invention is not restricted to these embodiments. The terminal game devices can communicate with each other directly through a network.

Figure 13:
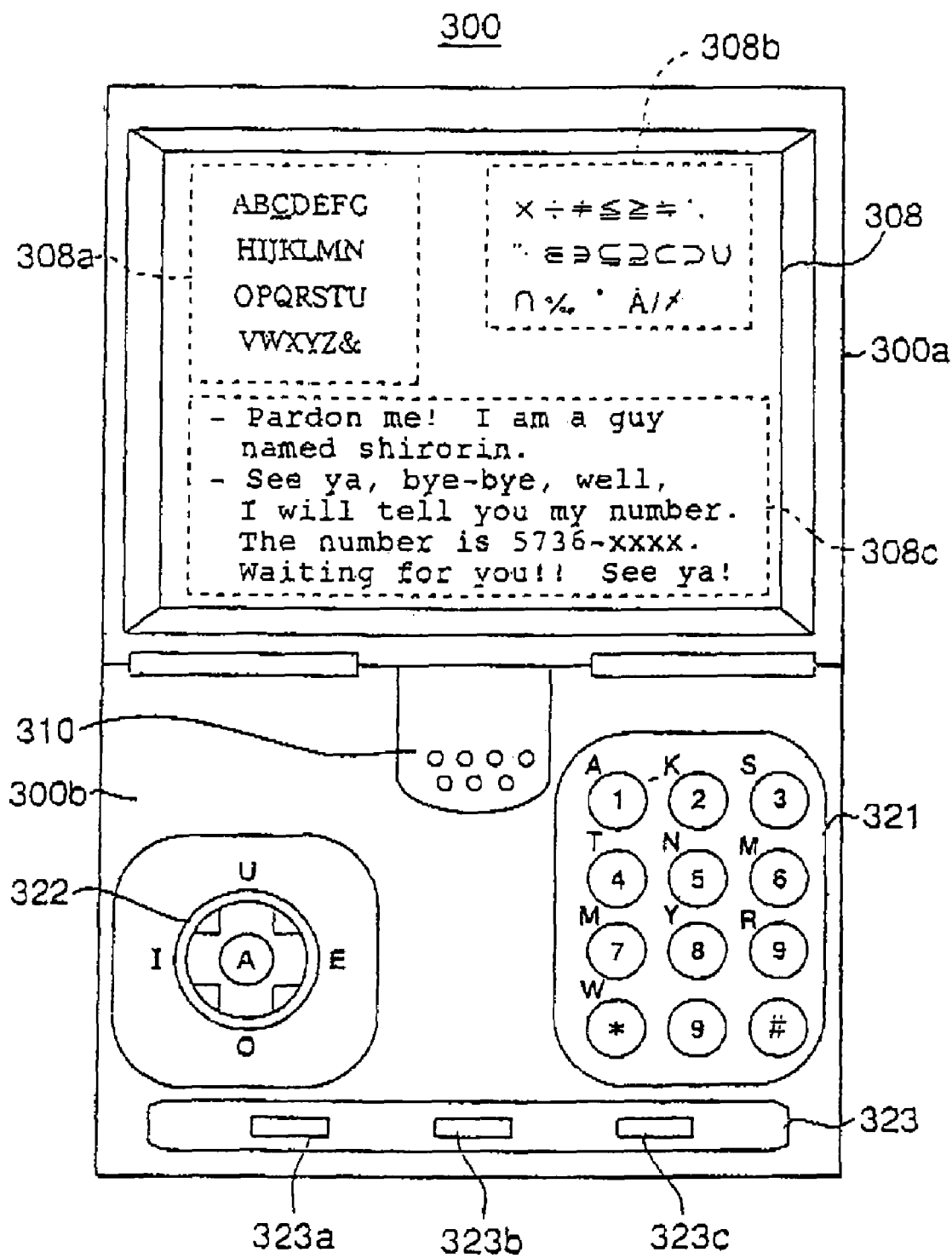
FIG. 13 is an explanatory view illustrating an example of a portable communication device (portable information processing device).

FIG. 13 is an explanatory diagram illustrating the fourth embodiment. This embodiment suggests a character inputting device in a portable communication device or a portable information processing device.

In FIG. 13, the portable communication device 300 is structured roughly by a cover 300a and a main body 300b. The cover 300a internally includes a display panel 305 made of liquid crystals, etc. Upon a character inputting mode, the display panel 308 is capable of displaying an English character displaying area 308a for displaying an English-character table intended for selection of English characters, a symbol displaying area 308b for displaying a symbol table intended for selecting symbols, and a message displaying area 308c intended for several messages out of the multiple messages registered in advance.

The main body 300b internally encloses a CPU board, etc., and the top face thereof constitutes an inputting panel. A speaker 310 is arranged at substantially the center of the upper verge of the input operating panel. To the right (in the longitudinal direction) with respect to the center of the input operation panel, a figure keyboard (figure keys) 321 is arranged. The figure keyboard includes figure buttons "0", through "9", and an "*" button and a "#" button. The figures may have the same arrangement as in a telephone set.

To the left (in the longitudinal direction) from the center of the input operation panel, a cross key 322 is arranged. By operating a cross-shape actuator, the cross key 322 is capable of designating upward (↑), downward (↓), rightward (→), or leftward (←) positions. Furthermore, the neutral position of the actuator may be designated as the fifth output ("N"). By operating the cross key 322, an upward, downward, rightward or leftward movement can be designated, as well as change of items selected out of a table, etc.

The figure key 321 is arranged on the right side and the cross key 322 on the left side for facilitating operation by both hands when the portable communication device is held in either hand.

At the lower verge of the input operating panel, mode selection switches 323a, 323b and 323c are arranged. The mode selection switch 323a is used for activating the selection mode of the registered (stock) messages. By operating this switch, display of the message displaying area 308c can be turned on/off. When operated, the mode selection switch 323b moves the cross key in a cursor mode. As a consequence, English characters and symbols can be input at the English character displaying area 308a and the symbol displaying area 308b. The switch 323 is used for switching among the Japanese hiragana character/Japanese katakana character/figure/lowercase/uppercase modes.

Figure 14:
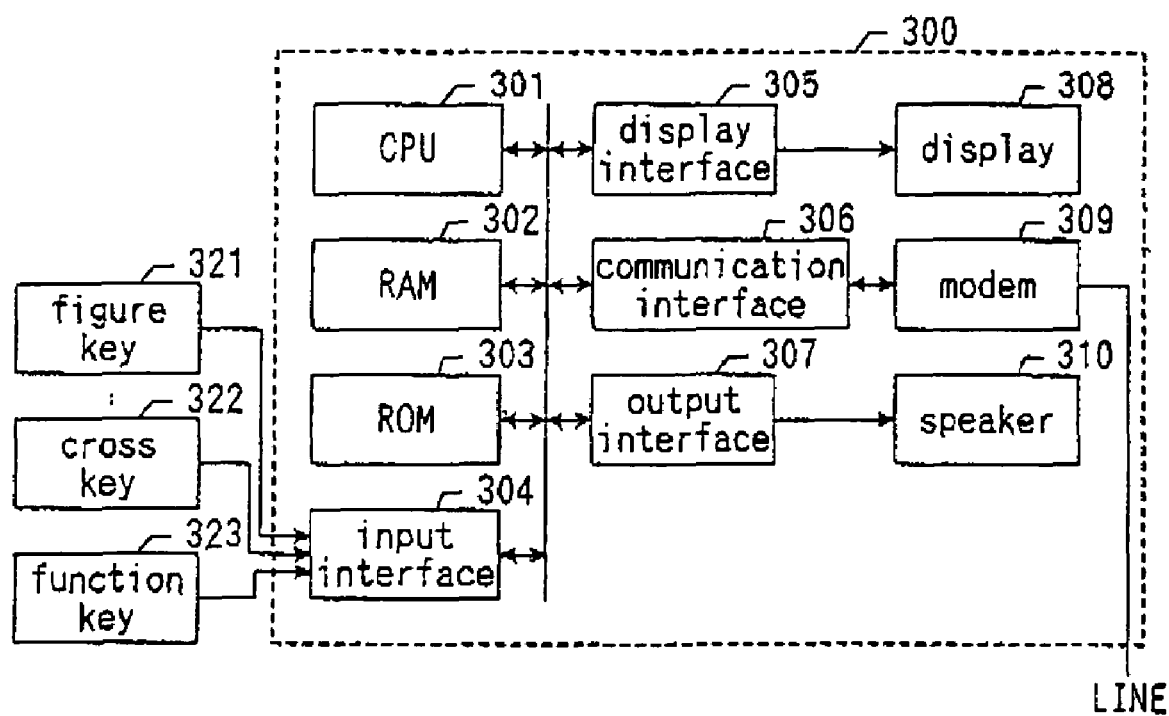
FIG. 14 is an explanatory view illustrating an example of an inner circuit structure of the portable communication device.

FIG. 14 is a block diagram schematically illustrating the structure of the portable communication device. In this Figure, any components corresponding to those shown in FIG. 13 are indicated with the same reference numerals. In FIG. 14, a CPU 301 implements data processing and controls the respective components according to an operating system program or an application program. A RAM 302 holds data and programs therein, and constitutes a principal work area for the CPU 301. A ROM 303 holds data and programs therein in a nonvolatile manner. An external inputting interface 304 encodes the respective output results by the figure key 321, the cross key 322 and the function keys 323 and outputs the same to the prescribed area of the RAM 302.

A display interface 305 displays to the liquid crystal display unit 308 any information written into the video RAM by the CPU 301. A communication interface 306 exchanges data signals between an analog circuit modem 309. Connected to the analog circuit modem 309 is, for example, a public telecommunication line, or a local area network. An external interface 307 intermediates the computer system and an externally connected device (for example, a printer). The external interface 307 includes a simple pronunciation circuit which drives a speaker 310.

Figure 15:
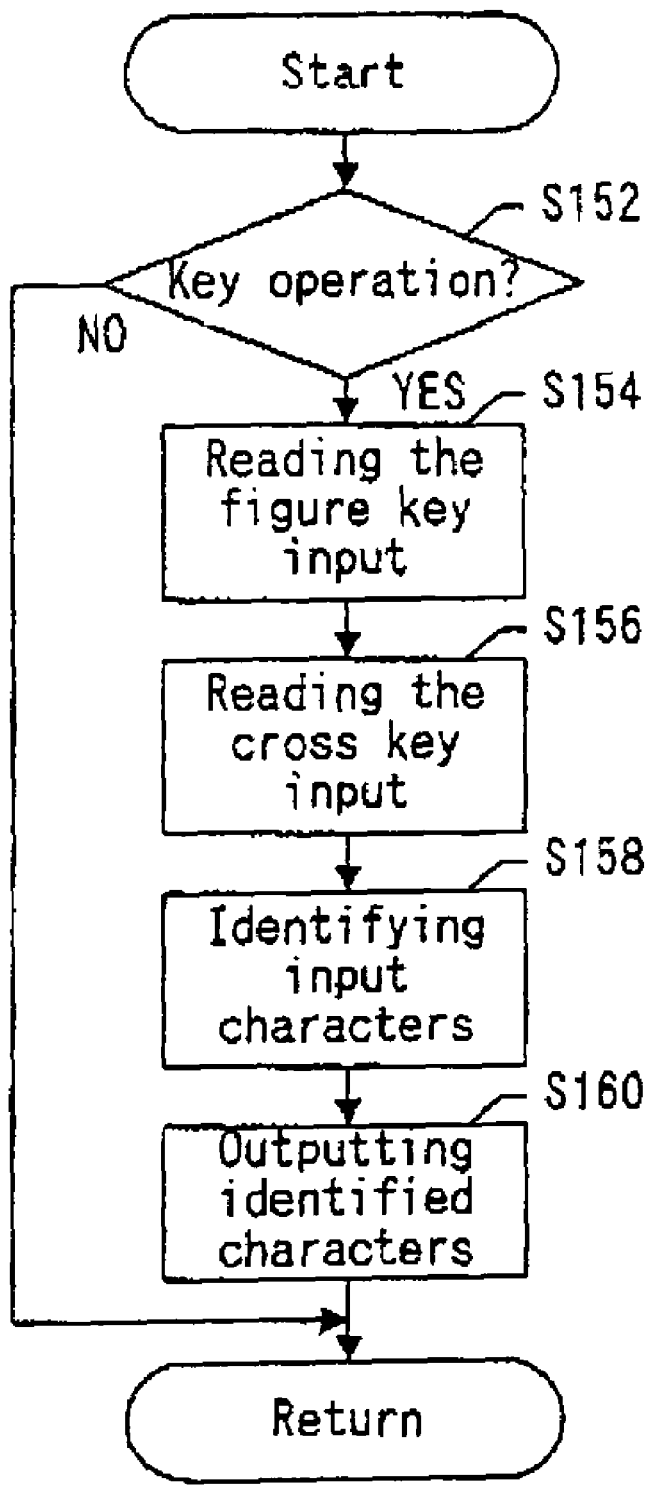
FIG. 15 is a flowchart illustrating an algorithm for distinguishing characters input through the operation of figure keys from those input through the operation of a cross key.

Input of characters under the structure above will now be explained with reference to FIG. 15. When a flag representing a Japanese (kana) character input mode is placed during the execution of the main program, the CPU executes the routine processing.

The CPU identifies whether or not a flag representing operation of the cross key has been placed. If the flag has not been placed, processing is returned to the main program and repeated again (S152; No).

If the flag indicating operation of the keys has been placed (S152; Yes), the CPU reads the value which has been input through the figure key 321 (S154) or the cross key. As mentioned above, neutral flag "N" is placed at the neutral position of the actuator.

Characters which have been input are then identified. For example, values "1" through "*" output by the figure keys respectively correspond to the "a" row, "ka" row, and "sa", through "wa" rows in the consonant arrangements of the Japanese fifty-syllabary. The values "N", "←" through "↓" output by the cross key correspond to the vowel arrangements of the Japanese fifty-syllabary. "N" corresponds to "a"; "←" to "i"; "↑" to "u"; "→" to "e"; and "↓" to "o". Characters can thus be input by the figure key and the cross key. For example, the CPU identifies a combination of: "1" and "↓" as "o"; "6" and "N" as "ha"; "8" and "↓" as "yo"; and "1" and "↑" as "u". Consequently, "1↓6N8↓1↑" is identified as "o•ha•yo•u".

Furthermore, if characters are divided and input one character at a time, the symbol "#" can be used for dividing the characters. For example, this symbol can be used as "1#↓#6#8↓#1↑#" or "1↓#6#8#1↑". Symbols serially input are converted to the Japanese kana characters "o•ha•yo•u". In this case, the symbol "N" above need not be used.

Moreover, values may be associated with the characters "a•ka•sa•ta•na•ha•ma•ya•ra•wa" in advance, and when there are two consecutive figures in the character or symbol sequences which are input, the first value can be converted to an applicable character out of "a•ka•sa•ta•na•ha•ma•ya•ra•wa". By doing so, "1↓68↓1↑" is, for example, identified as "o•ha•yo•u", and the symbol "N" above need not be added.

By the so-called "inter-program processing", the characters identified are delivered to a text processing program which has an editor function. The characters identified are displayed in the message forming area (not shown) The characters and symbols which have been input can be modified in this area.

Japanese kana characters can thus be input using the figure keys and the cross key.

Furthermore, although a cross key is used in the embodiment above, a joystick, a trackball or other pointing devices can be used instead.

INDUSTRIAL APPLICABILITY

As explained above, the character communication device according to the present invention requires no keyboard due to the terms displayed on the display being selected, assembled and transmitted as messages. Furthermore, even those who are not accustomed to typing on keyboards can easily use this device.

Furthermore, another word-card character communication device according to the present invention requires no keyboard and even those having no knowledge of foreign languages can communicate with foreigners.

Moreover, by the portable communication device (information processing device) according to the present invention, both hands can be used when the communication device is held in either hand, and the device also takes up less space.

What is claimed is:

1. A character communication system connected to a network and structured to include a character communication device capable of displaying a card showing at least a character to a party of a communication, comprising:
    a first character communication device using a first card group in one language for the communication; and
    a second character communication device using a second card group in another language for the communication;
    wherein the communication between said first and second character communication devices is performed by corresponding in advance a card from said first card group with a card from said second card group having a common meaning.

2. A character communication system connected to a network and structured to include a character communication device capable of displaying a card showing at least a character to a party of a communication, comprising:
    a first character communication device using a first card group in one language for the communication; and
    a second character communication device using a second card group in another language for the communication;
    wherein the communication between said first and second character communication devices is performed using a mark commonly assigned in advance to a card of said first message group and a card of said second message group having a common meaning.

* * * * *